United States Patent [19]

Knoll

[11] 4,283,975
[45] Aug. 18, 1981

[54] SYSTEM FOR SETTING THE SHEET LENGTH ON A CROSSCUTTER FOR WEBS OF MATERIAL

[75] Inventor: Heiko Knoll, Dusseldorf, Fed. Rep. of Germany

[73] Assignee: Jagenberg Werke AG, Dusseldorf, Fed. Rep. of Germany

[21] Appl. No.: 74,705

[22] Filed: Sep. 12, 1979

[30] Foreign Application Priority Data

Sep. 16, 1978 [DE] Fed. Rep. of Germany ....... 2840377

[51] Int. Cl.³ .............................................. B26D 5/20
[52] U.S. Cl. ........................................... 83/76; 83/71; 83/37; 83/324
[58] Field of Search ....................... 83/37, 76, 324, 74, 83/71, 72

[56] References Cited

U.S. PATENT DOCUMENTS

| | | | |
|---|---|---|---|
| 3,267,781 | 8/1966 | Sterns et al. | 83/37 |
| 3,543,620 | 12/1970 | Hilsenbeck et al. | 83/37 |
| 3,668,957 | 6/1972 | Nido | 83/37 |
| 3,742,798 | 7/1973 | Gries | 83/324 X |
| 3,797,368 | 3/1974 | Martelli | 83/324 X |
| 3,962,942 | 6/1976 | Ferara | 83/324 X |
| 4,020,406 | 4/1977 | Tokuno et al. | 83/76 X |

*Primary Examiner*—Donald R. Schran
*Attorney, Agent, or Firm*—Sprung, Felfe, Horn, Lynch & Kramer

[57] ABSTRACT

A system for setting the sheet length on a cross-cutter for webs of material includes a computer which delivers to the positioning element of a speed changing mechanism, the positioning signal for one speed corresponding to the desired sheet length and to a controlled group for the positioning element of an irregular motion mechanism and to a control loop for the positioning element of a continuously variable speed transmission. The desired values correspond to the desired sheet length and the control loop for the continuously variable speed mechanism receives as a actual value, the sheet length and specifies to the positioning element, the positioning time on the basis of the deviation of the actual value from the desired value and of the speed selected. Another comparison of actual value with desired value is made only at the completion of each positioning operation.

5 Claims, 2 Drawing Figures

SYSTEM FOR SETTING THE SHEET LENGTH ON A CROSSCUTTER FOR WEBS OF MATERIAL

BACKGROUND OF THE INVENTION

The invention relates to a system for setting the sheet length on a crosscutter for webs of material which comprises a feeding means and a pair of cutter rolls preceded by an irregular-motion mechanism, a common drive motor, and a sheet-size adjusting mechanism disposed between the feeding means and the irregular-motion mechanism and consisting of a speed-changing mechanism and a continuously variable speed transmission.

In setting a desired sheet size, it has heretofore been the practice to pick from a table the appropriate settings for the irregular-motion mechanism and the sheet-size adjusting mechanism and set these two mechanisms accordingly.

SUMMARY OF THE INVENTION

The invention has as its object to automate this setting operation.

This object is accomplished in that a computer delivers to the positioning element of the speed-changing mechanism the positioning signal corresponding to the desired sheet length for one speed, and delivers to a control loop for the positioning element of the irregular-motion mechanism and to a control loop for the positioning element of the continuously variable speed transmission the desired values corresponding to the desired sheet length, the control loop of the continuously variable speed transmission receiving as an actual value the sheet length and specifying to the positioning element the positioning time on the basis of the deviation of the actual value from the desired value, another comparison of the actual value with desired value being made only at the completion of each positioning operation.

In this system, the computer, which stored the positioning signals intended for the individual positioning elements and associated with a given sheet length, feeds these signals to the control loops either as positioning signals or as dedesired values. Because of the complex relationship between sheet length and positioning displacement of the continuously variable speed transmission at the various speeds, the deviation of the actual value of the sheet length from the desired value is corrected in the control loop of the continuously variable speed transmission, not directly by way of the positioning displacement but through the positioning time. This makes it possible to get along without a memory having a multitude of memory locations that would have to be programmed for the positioning displacements of the irregular-motion mechanism corresponding to the various deviations of the actual value from the desired value at the various speeds.

For measurement of the sheet length, there is preferably provided a counter which counts the pulses delivered by a pulse generator of the feeding means and corresponding to the path of the web between the start and stop pulses delivered by a pulse generator of the cutter rolls. Since the pulses delivered by the feeding means, e.g., the feed rolls, with every revolution are constant, all that changes with the speed of web travel is the pulse repetition rate. The more pulses are registered in the counter between a start signal and a stop signal from the cutter rolls, the greater the sheet length is.

In accordance with a further characteristic of the invention, the control loop for the continuously variable speed transmission comprises a controller which compares the position of the counter for the sheet length with the desired value and actuates a settable counter which is pulsed by a pulse generator at a pulse repetition rate that is based on the selected speed, the settable counter applying for the duration of the count a positioning signal to the positioning element of the continuously variable speed transmission. In this way, both the selected speed and the deviation of the actual value from the desired value of the sheet length are provided for without the use of expensive memory capacity, simply in that a counter is set to a position corresponding to the deviation of the actual value of the sheet length from the desired value and that counter position is decremented at greater or less speed by the pulses arriving with greater or smaller frequency as a function of the selected speed. The positioning element is actuated for the duration of this counting operation and positions the continuously variable speed transmission to the desired value.

The speed corresponding to the desired sheet length can also be selected simply by means of a computer in which the maximum and minimum values of the sheet length for each speed are stored, the computer comparing the entered desired value of the sheet length with these limit values and delivering a positioning signal for engagement of the speed whose associated minimum value is smaller than or equal to the desired value and whose maximum value is greater than or equal to the desired value. Thus the speed is set in an open control loop.

In a preferred embodiment of the invention, a transducer coupled to the positioning element of the irregular-motion mechanism delivers in the control loop for the latter the actual value, which is modified in a function generator, and more particularly an analog-to-digital converter, on the basis of the functional dependence between the values delivered by the transducer and the associated sheet lengths determined by the irregular-motion mechanism for comparison with the desired value specified as sheet length.

Since the degree of irregularity of the irregular-motion mechanism does not change even over the long run for the various settings, a relatively small function generator in the form of a programmable analog-to-digital converter can be used therefor.

BRIEF DESCRIPTION OF THE DRAWINGS

The invention will now be described in greater detail with reference to the accompanying drawing, wherein.

DETAILED DESCRIPTION OF THE INVENTION

Figure 1:
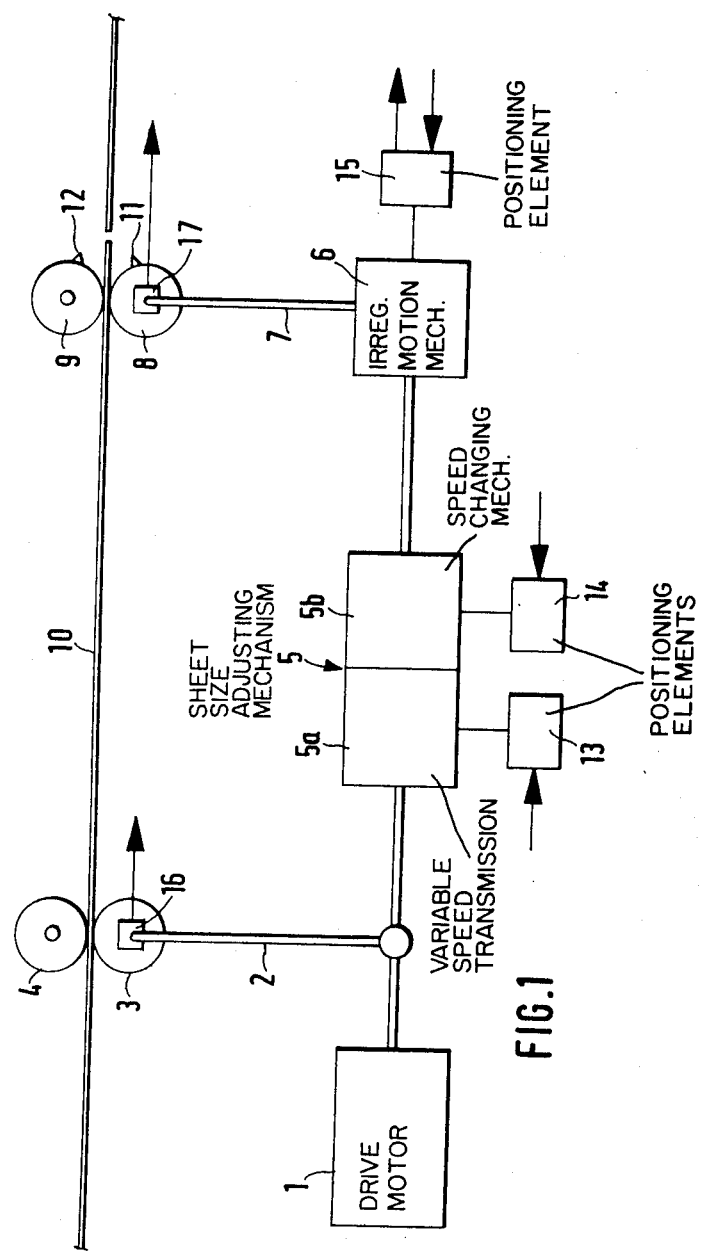
FIG. 1 is a diagrammatic representation of the layout of a crosscutter.

A drive motor 1 drives, through a shaft 2, a feeding means in the form of a pair of rolls 3 and 4, and, through a sheet-size adjusting mechanism 5 consisting of a continuously variable speed transmission such as a PIV transmission 5a and a speed-changing mechanism 5b, and through an irregular-motion mechanism 6 and a drive shaft 7 a pair of cutter rolls 8 and 9. The irregular-motion mechanism may be a connecting-rod mechanism whose peculiarity is that with uniform rotation on the input side the angular velocity on the output side varies over one revolution. In a crosscutter, such a mechanism is set so that at the instant the cut is made there is synchronism between the web of material 10 to be cut and the cutting blades 11 and 12.

To permit setting of the sheet-size adjusting mechanism 5 and the irregular-motion mechanism 6, there are associated with the PIV transmission 5a a positioning element 13, with the speed-changing mechanism 5b a positioning element 14, and with the irregular-motion mechanism 6 a positioning element 15. Arrows at the positioning elements 13 to 15 denote the inputting and outputting of positioning and status signals.

Pulse generators 16 and 17, respectively, are associated with both the feed-roll pair 3 and 4 and the cutter-roll pair 8 and 9. The pulse generator 16 delivers a specific number of pulses per revolution of the feed roll 3. The pulse repitition rate thus is a function of the rotative speed of the feed roll 3. The pulse generator 17, on the other hand, merely delivers a start pulse and a stop pulse with every revolution of the cutter rolls 8 and 9, and does so at the instant of the cut.

Figure 2:
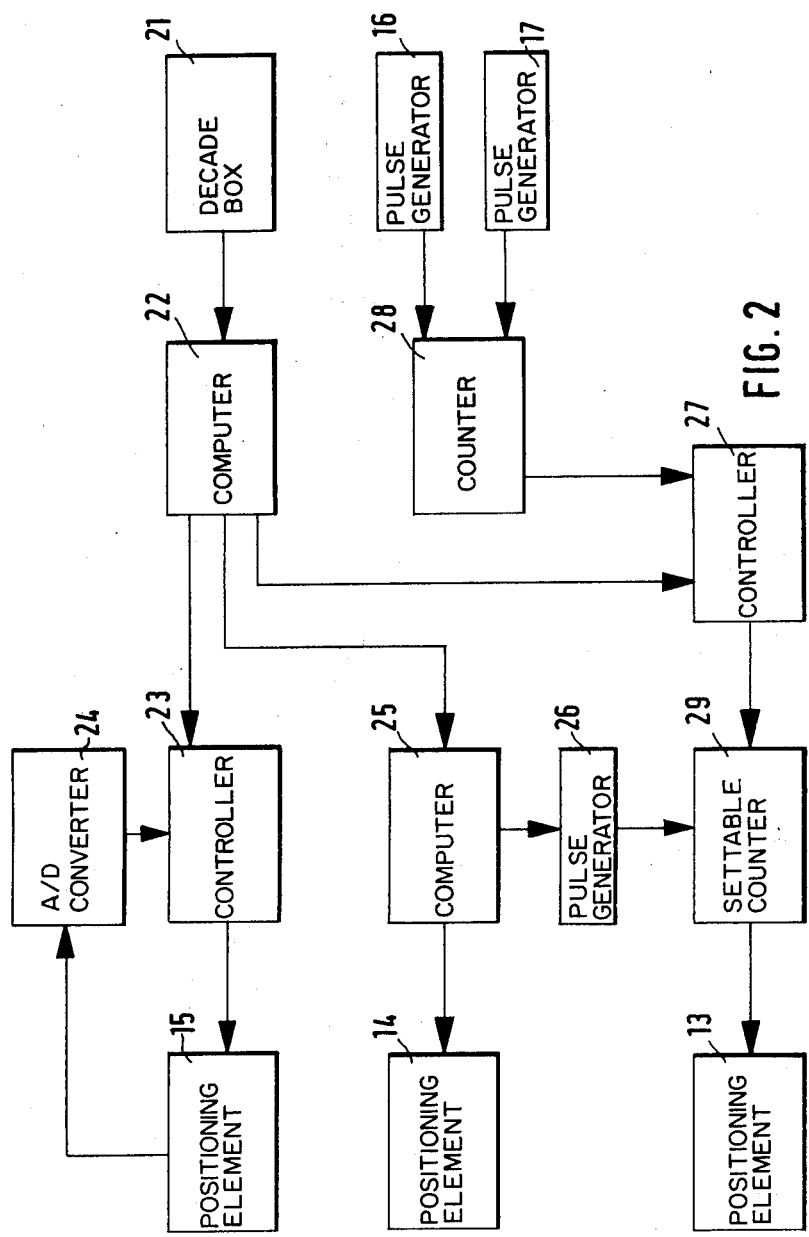
FIG. 2 is a block diagram of the means for setting the sheet size on the crosscutter according to FIG. 1.

The setting of the sheet-size adjusting mechanism 5 and of the irregular-motion mechanism 6 will now be described with reference to FIG. 2.

The desired sheet length is entered on a decade box 21. The latter delivers a corresponding 16-bit word to a computer 22, which on the basis of the 16-bit word delivers appropriate desired values to a control loop for the irregular-motion mechanism 6, to a control loops for the continuously variable speed transmission 5a, and to the control unit for the speed-changing mechanism 5b.

The control loop for the irregular-motion mechanism 6 comprises the positioning element 15, a controller 23, and an analog-to-digital converter 24 which is pulsed with an actual value delivered by the positioning element 15. The latter generates that actual value by means of a linear displacement transducer (potentiometer) which is mechanically linked to the connecting-rod slide of the irregular-motion mechanism 6, constructed as a connecting-rod mechanism. The analog-to-digital converter 24 constitutes a function converter that is programmed for the functional relationship between the signals delivered by the linear displacement transducer and the corresponding sheet-length signals of the irregular-motion mechanism 6. Thus the analog-to-digital converter 24 delivers a digital sheet-length signal corresponding to the positioning displacement of the linear displacement transducer to the controller 23, which compares this actual value with the desired value delivered by the computer 22. A positioning signal that is a function of the deviation of the actual value from the desired value is then delivered to the positioning element 15.

For selection of a speed corresponding to a given sheet length, the associated control unit comprises a computer 25 in which the minimum and maximum values are stored for each speed. The signal delivered by the computer 22 is compared with the particular minimum and maximum values, starting with the lowest speed and going on to the higher speeds. So long as this comparison shows that both values are smaller than the value delivered by the computer 22, the speed is not engaged but the value entered is compared with the limit values for the next speed. Only when it is found that the value entered is greater than or equal to the minimum value but smaller than or equal to the maximum value does the computer 25 deliver a control signal for engagement of the respective speed to the positioning element 14. The computer 25 further delivers a control signal to a pulse generator 26 which works with different pulse repetition rates for the various speeds.

While setting of the speed merely amounts to a coarse adjustment of the sheet size, precise adjustment is possible by means of the continuously variable speed transmission 5a. For this purpose the associated control loop comprises a controller 27 which receives from the computer 22 the desired value corresponding to the sheet size selected while from a counter 28 it receives the actual value. Counter 28 is pulsed by the pulse generators 16 and 17. Consequently the counter 28 is incremented by the pulses delivered by the pulse generator 16 between a start signal and a stop signal from the pulse generator 17. The pulses registered are a measure for the sheet length. The counter 28 delivers this counter position to the controller 27, which determines the deviation of the actual value from the desired value and sets a settable counter 29 which follows to the corresponding position. The pulses delivered by the pulse generator 26 then decrement the counter 29. For the entire duration of the count, the settable counter 29 applies a positioning signal to the positioning element 13 which shifts the PIV transmission 5a. Since the sheet-length range covered by the PIV transmission 5a differs for the various speeds, one and the same deviation of the actual value from the desired value requires different positioning times for the various speeds. In accordance with the invention, provision for this is made in that the pulse generator 26 delivers pulses at varying pulse repetition rates for the various speeds. When the sheet-length range of the PIV transmission 5a associated with a given speed is wide, the pulse repetition rate is high. At the end of the positioning time, another comparison of actual value with desired value is made and, if necessary, the PIV transmission 5a is shifted once more. In this way, the setting of the PIV transmission 5a at which the desired sheet length is obtained is arrived at in several steps requiring steadily less time.

It will be appreciated that the instant specification and claims are set forth by way of illustration and not limitation and that various changes and modifications may be made without departing from the spirit and scope of the present invention.

What is claimed is:

1. In a system for setting the sheet length on a crosscutter for webs of material which comprises a feeding means including a pair of feed rolls, cutting means including a pair of cutter rolls preceded by an irregular-motion mechanism and an positioning element associated therwith, a common drive motor, and a sheet-size adjusting mechanism disposed between the feeding means and the irregular-motion mechanism and including a speed-changing mechanism and a continuously variable speed transmission and positioning elements associated therewith, the improvement comprising: first means forming a first control loop for the positioning element of the irregular-motion mechanism; second means forming a second control loop for the positioning element of the speed transmission; means for producing a positioning signal for one speed corresponding to the desired sheet length and for applying same to the first control loop, the positioning element of the speed changing mechanism and to the second control loop, wherein the desired values correspond to the desired sheet length, and wherein the second control loop of the continuously variable speed transmission includes means receptive, as an actual value, the sheet length for specifying to the associated positioning element the positioning time on the basis of the deviation of the actual value from the desired value and of the speed selected and for making another comparison of actual value with desired value only at the completion of each positioning operation.

2. A system according to claim 1, wherein the feeding means comprises a first pulse generator and the cutting means includes a second pulse generator for producing start and stop signals and the second control loop comprises means for measuring the sheet length comprising a counter for counting the pulses corresponding to the web path and delivered by the first pulse generator of the feeding means between the start and stop pulses delivered by the second pulse generator of the cutting means.

3. A system according to claim 2, wherein the second control loop for the continuously variable speed transmission comprises a controller which compares the position of the counter for the sheet length with the desired value, a third pulse generator for producing pulses at a pulse repetition rate that is a function of the speed selected and a settable counter actuated by the controller to count the pulses from the third pulse generator and applying for the duration of the count a positioning signal to the positioning element of the continuously variable speed transmission.

4. A system according to claim 1, further comprising means for storing the maximum and minimum values of the sheet length for each speed and for comparing the desired value of the sheet length entered with these limit values then delivering a positioning signal for engagement of the speed whose associated minimum value is smaller than or equal to the desired value and whose maximum value is greater than or equal to the desired value.

5. A system according to claim 1, wherein the first control loop comprises a transducer coupled to the associated positioning element for producing the actual value, an analog-to-digital converter for modifying the actual value on the basis of the functional dependence between the values delivered by the transducer and the associated sheet lengths determined by the irregular-motion mechanism for comparison with the desired value entered as sheet length.

* * * * *